United States Patent
Makki et al.

(10) Patent No.: US 12,075,266 B2
(45) Date of Patent: Aug. 27, 2024

(54) HANDLING OF DETERIORATING AP-TO-AP WIRELESS LINK

(71) Applicant: Telefonaktiebolaget LM Ericsson (publ), Stockholm (SE)

(72) Inventors: Behrooz Makki, Gothenburg (SE); Mona Hashemi, Ottawa (CA); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 609 days.

(21) Appl. No.: 17/289,986

(22) PCT Filed: Nov. 2, 2018

(86) PCT No.: PCT/EP2018/080010
§ 371 (c)(1),
(2) Date: Apr. 29, 2021

(87) PCT Pub. No.: WO2020/088773
PCT Pub. Date: May 7, 2020

(65) Prior Publication Data
US 2021/0400504 A1    Dec. 23, 2021

(51) Int. Cl.
*H04W 24/04*    (2009.01)
*H04W 92/20*    (2009.01)

(52) U.S. Cl.
CPC ............ *H04W 24/04* (2013.01); *H04W 92/20* (2013.01)

(58) Field of Classification Search
CPC ..... H04W 24/04; H04W 24/00; H04W 24/02; H04W 24/06; H04W 24/08; H04W 24/10;
(Continued)

(56) References Cited

U.S. PATENT DOCUMENTS

| 8,675,550 B2 | 3/2014 | Rao et al. |
| 9,948,361 B2 | 4/2018 | Kohli |

(Continued)

FOREIGN PATENT DOCUMENTS

| CN | 112534851 A | * | 3/2021 | ......... H04L 63/0884 |
| ES | 2843258 T3 | * | 7/2021 | ............ H04W 16/14 |

(Continued)

OTHER PUBLICATIONS

International Search Report and Written Opinion issued in International Application No. PCT/EP2018/080010 dated May 31, 2019 (13 pages).

(Continued)

*Primary Examiner* — Phong La
(74) *Attorney, Agent, or Firm* — Rothwell, Figg, Ernst & Manbeck, P.C.

(57) ABSTRACT

There is provided mechanisms for handling a deteriorating AP-to-AP wireless link in an IAB network. A method is performed by a first AP in the IAB network. The method comprises identifying signal deterioration of a first AP-to-AP wireless link between the first AP and a second AP in the IAB network. The first AP-to-AP wireless link is used for backhauling data for CPEs served by the second AP and for backhauling data for CPEs served by a third AP in the IAB network. The second AP has a second AP-to-AP wireless link to the third AP for backhauling data for the CPEs served by the third AP. The method comprises, in response thereto, relaying the data via a first CPE of the CPEs served by the second AP on a first direct wireless link between the first AP and the first CPE.

17 Claims, 5 Drawing Sheets

(58) Field of Classification Search
CPC ..... H04W 92/20; H04W 92/16; H04W 92/22; H04W 92/24

See application file for complete search history.

(56) References Cited

U.S. PATENT DOCUMENTS

| | | | |
|---|---|---|---|
| 10,171,159 B1* | 1/2019 | Tailor | H04L 5/006 |
| 11,012,141 B1* | 5/2021 | Parihar | H04L 5/0048 |
| 2016/0226563 A1 | 8/2016 | Kohli | |
| 2017/0331670 A1* | 11/2017 | Parkvall | H04L 41/0816 |
| 2018/0227268 A1 | 8/2018 | Ong et al. | |
| 2019/0037466 A1* | 1/2019 | Saiwai | H04W 76/14 |
| 2019/0052381 A1* | 2/2019 | Abdelmonem | H04B 17/336 |
| 2019/0132044 A1* | 5/2019 | Hreha | H04B 17/309 |
| 2020/0367234 A1* | 11/2020 | Bergström | H04W 72/0446 |
| 2021/0400504 A1* | 12/2021 | Makki | H04W 24/04 |
| 2022/0103683 A1* | 3/2022 | Engelke | H04M 3/42391 |

FOREIGN PATENT DOCUMENTS

| | | | | |
|---|---|---|---|---|
| JP | 2020205619 A | * | 12/2020 | .......... H04W 36/165 |
| WO | 2014/117832 A1 | | 8/2014 | |
| WO | WO-2015034668 A1 | * | 3/2015 | ............ H04L 5/0032 |
| WO | WO-2019010049 A1 | * | 1/2019 | .......... H04W 12/069 |

OTHER PUBLICATIONS

CATT, "IAB failure handling", 3GPP TST-RAN WG3 #10bis, R3-185560, Chengdu, China, Oct. 8-12, 2018 (7 pages).

3GPP TS 36.216 V10.1.0 (Dec. 2011), 3rd Generation Partnership Project; Technical Specification Group Radio Access Network; Evolved Universal Terrestrial Radio Access (E-UTRA); Physical layer for relaying operation (Release 10), Dec. 2010 (15 pages).

Heinz A. Willebrand et al., "Fiber Optics Without Fiber", LightPointe Communications Inc., IEEE Spectrum, Aug. 2001 (6 pages).

* cited by examiner

HANDLING OF DETERIORATING AP-TO-AP WIRELESS LINK

CROSS REFERENCE TO RELATED APPLICATIONS

This application is a 35 U.S.C. § 371 National Stage of International Patent Application No. PCT/EP2018/080010, filed Nov. 2, 2018, designating the United States.

TECHNICAL FIELD

Embodiments presented herein relate to methods, an access point (AP), a customer premises equipment (CPE), computer programs, and a computer program product for handling a deteriorating AP-to-AP wireless link in an integrated access and backhaul (JAB) network.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the ability to provide high-rate data streams. To meet such a demand, it might be required to use large bandwidths. Some communications networks are mainly concentrated on millimeter wave-based (potentially, massive multiple-input and multiple-output (MMIMO)) wireless links as an enabler to obtain sufficiently large bandwidths and data rates. The presence of wide bandwidths makes it possible to include the wireless backhaul transport in the same spectrum as the wireless access. For this reason, JAB network configurations have been considered where a (potentially, fiber-connected) AP provides other APs as well as the CPEs inside its cell area with wireless backhaul and access connections, respectively. Further in this respect, both the APs and the CPEs are assumed to be geographically stationary during operation. JAB networks can have either star-like configuration with multiple APs wirelessly backhauled through direct single-hop connections to the fiber-connected AP, or a cascade configuration with APs wirelessly connected to the fiber-connected AP in a multi-hop fashion.

In an JAB network, the backhaul, i.e., the AP-to-AP wireless links, is one bottleneck of the transmission setup. The main performance degradations of the AP-to-AP wireless links are blockage and error propagation. Particularly, the AP-AP wireless links transfer an aggregated data of a large number of CPEs served by, e.g., different APs of the multi-hop network. Thus, to support high data rates, narrow beams at millimeter wave bandwidths with strong line of sight (LOS) signal components might be needed. As a result, the system performance is significantly affected if the LOS link is blocked. Particularly, with a multi-hop network configuration, if an AP-AP wireless link is blocked, e.g., by a truck or a group of flying birds, or any other object, the error propagates and an outage will occur for all APs in the successive hops as well as their corresponding CPEs.

There is therefore a need to compensate for blockage and error propagation. For this reason it has been suggested to use the strongest non-LOS path with reflections to bypass the blockage. However, the non-LOS signals are by orders of magnitude, often more than 10 dB, weaker than the LOS signal and, with high probability, retransmissions may be needed. Further, the error propagation is not reduced by non-LOS connection scheme.

Hence, there is still a need for an improved handling blockage and error propagation in an IAB network.

SUMMARY

An object of embodiments herein is to provide efficient handling of deteriorating wireless links in an IAB network that enables improved handling blockage and error propagation in the IAB network.

According to a first aspect there is presented a method for handling a deteriorating AP-to-AP wireless link in an IAB network. The method is performed by a first AP in the IAB network. The method comprises identifying signal deterioration of a first AP-to-AP wireless link between the first AP and a second AP in the IAB network. The first AP-to-AP wireless link is used for backhauling data for CPEs served by the second AP and for backhauling data for CPEs served by a third AP in the IAB network. The second AP has a second AP-to-AP wireless link to the third AP for backhauling data for the CPEs served by the third AP. The method comprises, in response thereto, relaying the data via a first CPE of the CPEs served by the second AP on a first direct wireless link between the first AP and the first CPE.

According to a second aspect there is presented a first AP for handling a deteriorating AP-to-AP wireless link in an IAB network. The first AP is operable in the IAB network and comprises processing circuitry. The processing circuitry is configured to cause the first AP to identify signal deterioration of a first AP-to-AP wireless link between the first AP and a second AP in the IAB network. The first AP-to-AP wireless link is used for backhauling data for CPEs served by the second AP and for backhauling data for CPEs served by a third AP in the IAB network. The second AP has a second AP-to-AP wireless link to the third AP for backhauling data for the CPEs served by the third AP. The processing circuitry is configured to cause the first AP to, in response thereto, relay the data via a first CPE of the CPEs served by the second AP on a first direct wireless link between the first AP and the first CPE.

According to a third aspect there is presented a first AP for handling a deteriorating AP-to-AP wireless link in an IAB network. The first AP is operable in the IAB network. The first AP comprises an identify module configured to identify signal deterioration of a first AP-to-AP wireless link between the first AP and a second AP in the IAB network. The first AP-to-AP wireless link is used for backhauling data for CPEs served by the second AP and for backhauling data for CPEs served by a third AP in the IAB network. The second AP has a second AP-to-AP wireless link to the third AP for backhauling data for the CPEs served by the third AP. The first AP comprises a relay module configured to, in response thereto, relay the data via a first CPE of the CPEs served by the second AP on a first direct wireless link between the first AP and the first CPE.

According to a fourth aspect there is presented a computer program for handling a deteriorating AP-to-AP wireless link in an IAB network. The computer program comprises computer program code which, when run on processing circuitry of an AP, causes the AP to perform a method according to the first aspect.

According to a fifth aspect there is presented a method for handling a deteriorating AP-to-AP wireless link in an IAB network. The method is performed by a CPE in the IAB network. The CPE is served by a second AP in the IAB network. The method comprises relaying data for CPEs served by a third AP in the IAB network between a first AP in the IAB network and the third AP on a first direct wireless link between the CPE and the first AP and on a wireless link between the CPE and the third AP upon signal deterioration of a first AP-to-AP wireless link between the first AP and the second AP.

According to a sixth aspect there is presented a CPE for handling a deteriorating AP-to-AP wireless link in an IAB network. The CPE is operable in the IAB network and comprises processing circuitry. The CPE is configured to be served by a second AP in the IAB network. The processing circuitry is configured to cause the CPE to relay data for CPEs served by a third AP in the IAB network between a first AP in the IAB network and the third AP on a first direct wireless link between the CPE and the first AP and on a wireless link between the CPE and the third AP upon signal deterioration of a first AP-to-AP wireless link between the first AP and the second AP.

According to a seventh aspect there is presented a CPE for handling a deteriorating AP-to-AP wireless link in an IAB network. The CPE is operable in the IAB network. The CPE is configured to be served by a second AP in the IAB network. The CPE comprises a relay module configured to relay data for CPEs served by a third AP in the IAB network between a first AP in the IAB network and the third AP on a first direct wireless link between the CPE and the first AP and on a wireless link between the CPE and the third AP upon signal deterioration of a first AP-to-AP wireless link between the first AP and the second AP.

According to an eight aspect there is presented a computer program for handling a deteriorating AP-to-AP wireless link in an IAB network, the computer program comprising computer program code which, when run on processing circuitry of a CPE, causes the CPE to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these APs, these CPEs, these computer programs, and this computer program product provide efficient handling of deteriorating wireless links in an IAB network.

Advantageously these methods, these APs, these CPEs, these computer programs, and this computer program product enable improved handling blockage and error propagation in the IAB network.

Advantageously these methods, these APs, these CPEs, these computer programs, and this computer program product enable the AP-to-AP wireless link experiencing signal deterioration to be isolated from other APs, thereby improving the service availability.

Advantageously these methods, these APs, these CPEs, these computer programs, and this computer program product enable the network handshaking overhead, e.g., for initial access in different hops, to be reduced since hops on the non-affected AP-to-AP links are not affected by the signal deterioration of the AP-to-AP wireless link experiencing signal deterioration as used for any previous hops. This reduces the end-to-end data transmission delay.

Advantageously these methods, these APs, these CPEs, these computer programs, and this computer program product might enable also a LOS link to be established also when the affected AP-to-AP wireless link is not used. This in turn reduces the link failure probability.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
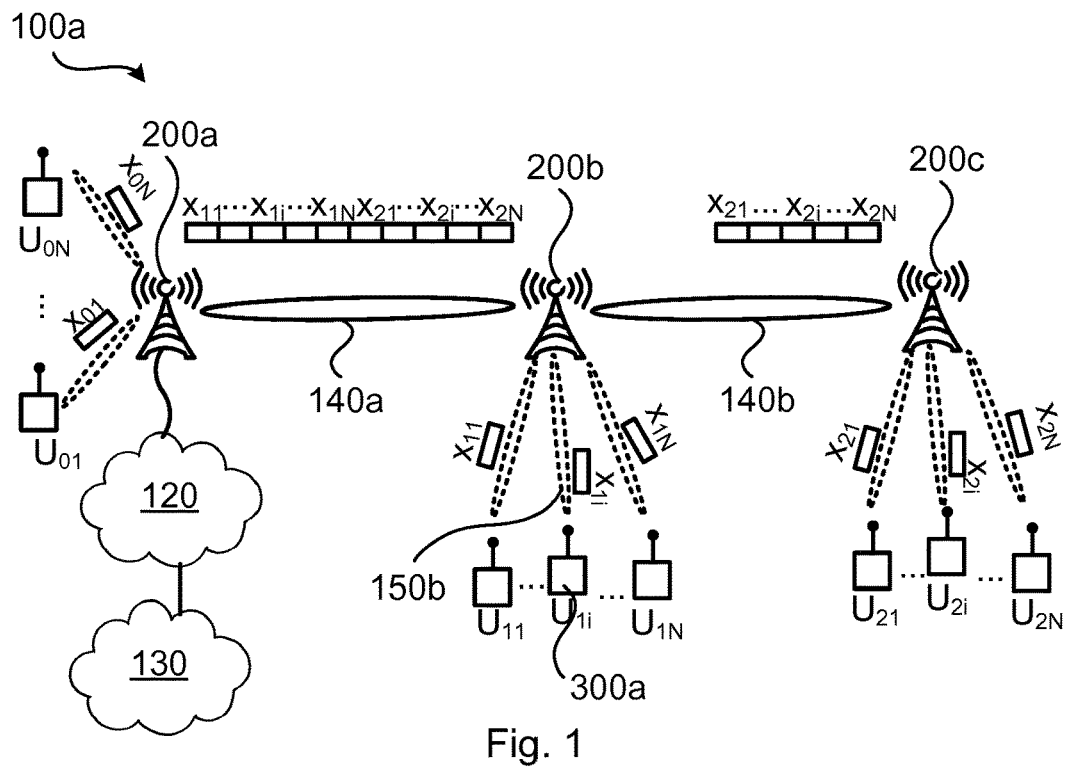
FIGS. 1, 3, and 4 are schematic diagrams illustrating communication networks according to embodiments.

FIG. 1 is a schematic diagram illustrating a communications network 100*a* where embodiments presented herein can be applied. The communications network 100*a* comprises APs 200*a*, 200*b*, 200*c*, where for illustrative purposes AP 200*a* will be denoted a first AP 200*a*, AP 200*b* will be denoted a second AP 200*b*, and AP 200*c* will be denoted a third AP 200*c*. The first AP 200*a* and the second AP 200*b* are configured to communicate over a first AP-to-AP wireless link 140*a*. The second AP 200*b* and the third AP 200*c* are configured to communicate over a second AP-to-AP wireless link 140*b*. The communications network 100*a* further comprises CPEs denoted $U_{01}, \ldots, U_{0N}$ served by the first AP 200*a*, CPEs denoted $U_{11} \ldots, U_{1N}$ served by the second AP 200*b*, and CPEs denoted $U_{21}, \ldots, U_{2N}$ served by the third AP 200b. One of the CPEs $U_{1i}$ served by the second AP 200b will hereinafter be referred to as CPE 300a. In turn, each CPE is configured to provide network access to one or more terminal devices, such as user equipment (UE), network equipped sensors, Internet of Things (IoT) devices, network equipped vehicles, and the like. The CPEs are commonly geographically stationary. For example, the CPEs could be mounted on rooftops of premises, and rarely be moved. The APs 200a, 200b, 200c communicate with its served CPEs over direct wireless links. In the illustrative example of FIG. 1 the direct wireless link between the second AP 200b and CPE 300a is identified at reference numeral 150b.

Further, one of the APs 200a, 200b, 200c (in the illustrative example of FIG. 1 the first AP 200a) is operatively connected to a core network 120 which in turn is operatively connected to a service network 130. Data can thereby be communicated to and from all CPEs served by the APs. In some aspects at least some of the data that is communicated is data that is backhauled. The communications network 100a can thus be regarded as an IAB network and will hereinafter be referred to an IAB network 100a. FIG. 1 further illustrates how messages $[x_{01}, \ldots, x_{0N}, x_{11}, \ldots, x_{1N}, x_{21}, \ldots, x_{2N}]$ are communicated to (or from) the CPEs. Each message comprises data. Thus, message $x_{01}$ comprises data transmitted to, or from, CPE $U_{01}$, and so on.

As noted above if an AP-AP wireless link is blocked, the error propagates and an outage will occur for all APs in the successive hops as well as their corresponding CPEs. Thus, if AP-AP wireless link 140a suffers from signal deterioration, not only the second AP 200b and the third AP 200c will be affected, but also all CPEs served by the second AP 200b and the third AP 200c.

The embodiments disclosed herein thus relate to mechanisms for handling a deteriorating AP-to-AP wireless link in an IAB network 100a, 100b, 100c. In order to obtain such mechanisms there is provided an AP 200a, a method performed by the AP 200a, a computer program product comprising code, for example in the form of a computer program, that when run on processing circuitry of the AP 200a, causes the AP 200a to perform the method. In order to obtain such mechanisms there is further provided a CPE 300a, a method performed by the CPE 300a, and a computer program product comprising code, for example in the form of a computer program, that when run on processing circuitry of the CPE 300a, causes the CPE 300a to perform the method.

Figure 2:
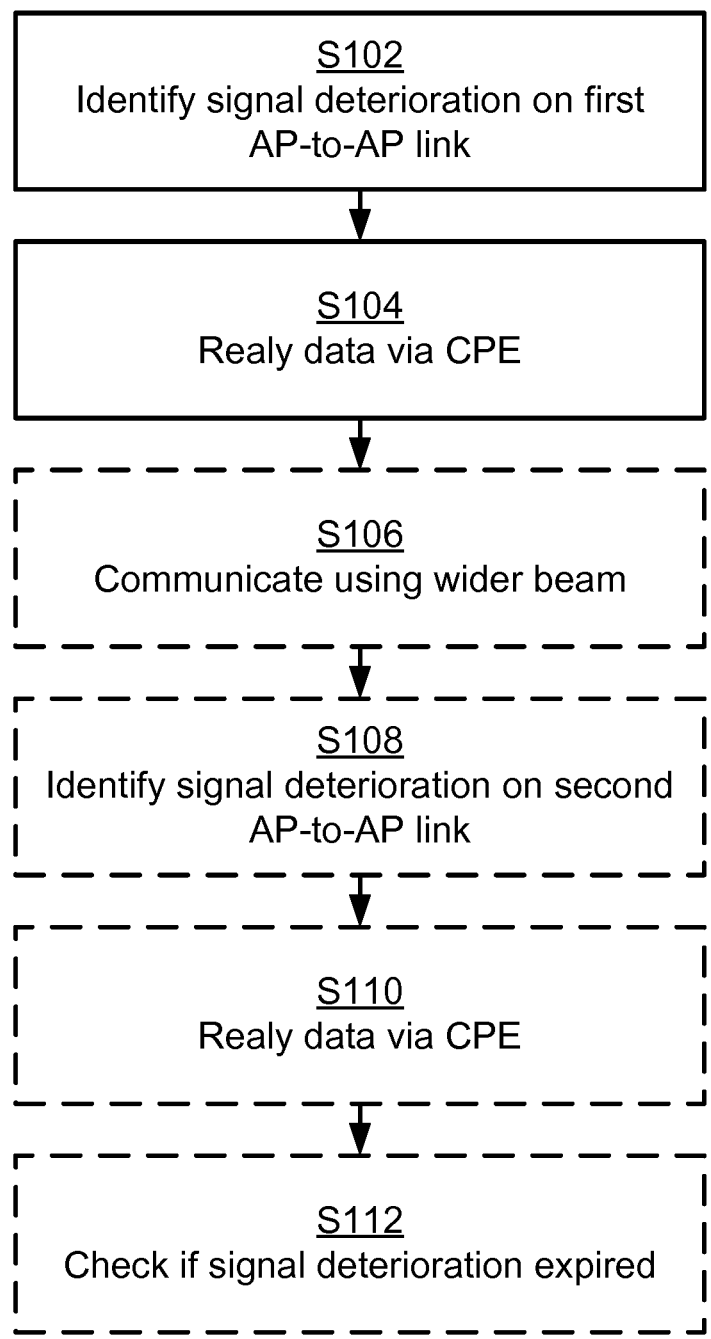
FIGS. 2 and 5 are flowcharts of methods according to embodiments.

Reference is now made to FIG. 2 illustrating a method for handling a deteriorating AP-to-AP wireless link in an IAB network 100a, 100b, 100c as performed by the AP 200a according to an embodiment. The AP 200a is operable in the IAB network 100a, 100b, 100c.

It is assumed that signal deterioration is experienced on one of the AP-to-AP wireless links. Hence, the first AP 200a is configured to perform step S102:

S102: The first AP 200a identifies signal deterioration of a first AP-to-AP wireless link 140a. The first wireless link 140a is between the first AP 200a and a second AP 200b in the IAB network 100a, 100b, 100c. The first AP-to-AP wireless link 140a is used for backhauling data for CPEs served by the second AP 200b. The first AP-to-AP wireless link 140a is further used for backhauling data for CPEs served by a third AP 200c in the IAB network 100a, 100b, 100c. The second AP 200b has a second AP-to-AP wireless link 140b to the third AP 200c for backhauling data for the CPEs served by the third AP 200c.

If signal deterioration is identified, one of the CPEs acts as a relay node in order to provide an alternative pass to the next hops. Hence, the first AP 200a is configured to perform step S104:

S104: The first AP 200a, in response thereto (i.e., in response to having identified the signal deterioration in step S102), relays the data via a first CPE 300a of the CPEs served by the second AP 200b on a first direct wireless link 150a between the first AP 200a and the first CPE 300a.

The second AP-to-AP wireless link 140b is thereby isolated from the signal deterioration on the first AP-to-AP wireless link 140a. Thus, error propagation is prevented and the performance for the third AP 200c (and its corresponding CPEs) is not affected by the signal deterioration. On the other hand, using the alternative link (i.e., the first direct wireless link 150a between the first AP 200a and the first CPE 300a) increases the successful message decoding probability in the second AP 200b. This makes the IAB network 100a, 100b, 100c robust to blockage/error propagation (or other causes for the signal deterioration) and improves the service availability. That is, in some examples the signal deterioration of the first AP-to-AP wireless link 140a is caused by blocking of the first AP-to-AP wireless link 140a.

As a result, the error propagation probability is reduced and, in the worst case, only a few CPEs associated with the thus blocked second AP 200b might experience an outage. The thus provided smart cooperative IAB network 100a, 100b, 100c thereby reduces both blockage and error propagation effects.

Embodiments relating to further details of handling a deteriorating AP-to-AP wireless link in an IAB network 100a, 100b, 100c as performed by the AP 200a will now be disclosed.

Figure 3:
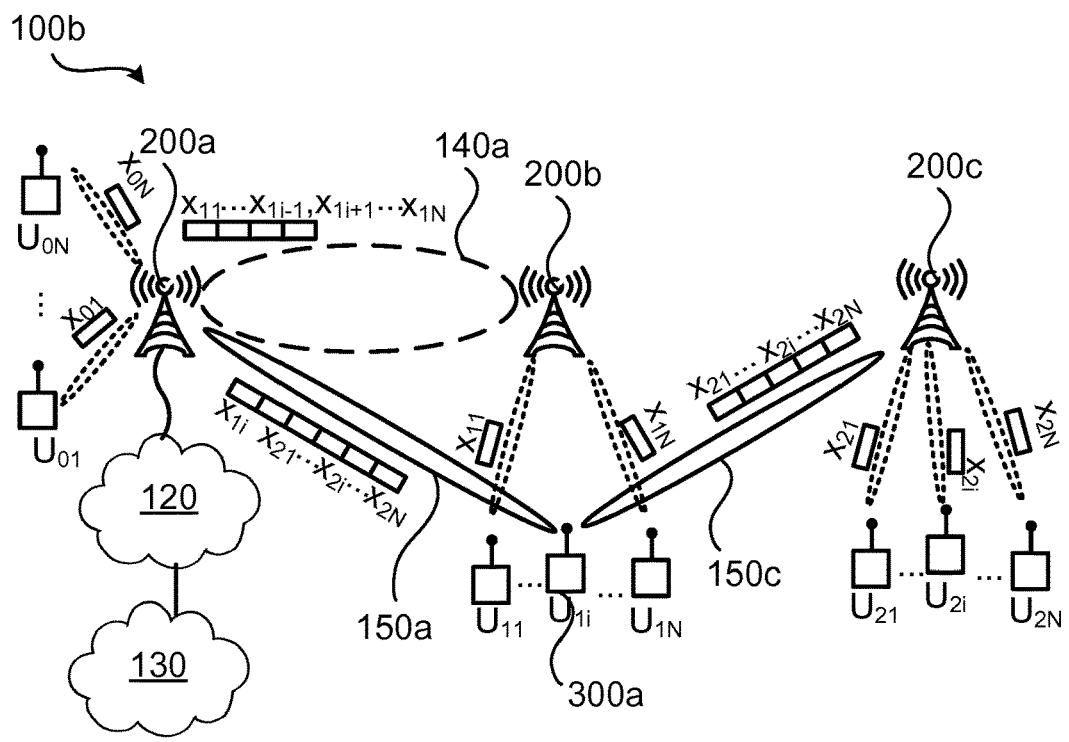

Intermediate reference is made to the communication network 100b of FIG. 3. In the illustrative example of FIG. 3, signal deterioration is experienced on the first AP-to-AP wireless link 140a and data is relayed via the first CPE 300a of the CPEs served by the second AP 200b on a first direct wireless link 150a. In the illustrative example of FIG. 3, messages $[x_{21}, \ldots, x_{2N}]$ for CPEs $U_{21}, \ldots, U_{2N}$ served by the third AP 200c as well as message $[x_{1i}]$ for the first CPE 300a are communicated on the first direct wireless link 150a. The CPE 300a thus acts a relay node for the messages $[x_{21}, \ldots, x_{2N}]$ for CPEs $U_{21}, \ldots, U_{2N}$ served by the third AP 200c.

As in the illustrative example of FIG. 3, in some aspects the first AP-to-AP wireless link 140a is widened in response to signal deterioration being identified for the first AP-to-AP wireless link 140a. This might lessen, mitigate, or reduce, the effects of the signal deterioration. Particularly, a transmission and reception beam of a first beam width is used for the first AP-to-AP wireless link 140a. According to an embodiment, the first AP 200a is further configured to perform (optional) step S106:

S106: The first AP 200a communicates, upon having identified the signal deterioration, on the first AP-to-AP wireless link 140a using a transmission and reception beam of a second beam width. The second beam width is wider than the first beam width. The first AP 200a communicates, using a transmission and reception beam of a second beam width, the data for all CPEs served by the second AP 200b, except the data for the first CPE 300a. In the illustrative example of FIG. 3, messages $[x_{11}, \ldots, x_{1i-1}, x_{1i+1}, \ldots, x_{1N}]$ for CPEs $U_{11} \ldots, U_{1i-1}, U_{1i+1}, \ldots, U_{1N}$ served by the second AP 200b (i.e., all CPEs served by the second AP 200b except CPE 300a) are communicated on the first AP-to-AP wireless link 140a.

In some aspects the transmission power of the first AP-to-AP wireless link 140a is increased in response to signal deterioration being identified for the first AP-to-AP wireless link 140a. That is, according to an embodiment the transmission and reception beam of the second beam width has higher power than the transmission and reception beam of the first beam width. This might lessen, mitigate, or reduce, the effects of the signal deterioration. Adaptive beamforming and/or adaptive power allocation might thus be applied to reduce the outage probability of the first AP-to-AP wireless link 140a.

There could be different ways for the first AP 200a to identify the signal deterioration. In some aspects, the signal deterioration of the first AP-to-AP wireless link 140a is identified in terms of decreasing signal to noise ratio (SNR) or signal to interference plus noise ratio (SINR). That is, according to an embodiment, the signal deterioration of the first AP-to-AP wireless link 140a is identified by determining that signal quality of the first AP-to-AP wireless link 140a is below a signal quality threshold value.

In some aspects, the signal deterioration of the first AP-to-AP wireless link 140a is identified in terms of lack of expected responses, such as no acknowledgement/negative acknowledgement (ACK/NACK) feedback being received from the second AP 200b. That is, according to an embodiment, the signal deterioration of the first AP-to-AP wireless link 140a is identified by determining a lack of reception of expected responses from the second AP 200b.

In some aspects the messages carrying the data to backhauled is split into different sub-messages based on the specific network configuration and based on which AP-to-AP wireless link that suffers from signal deterioration such that no, or at least as little as possible, extra relaying delay is added to the network. Particularly, according to an embodiment only the data for the first CPE 300a and the data for the CPEs served by the third AP 200c are relayed on the direct wireless link 150a to the first CPE 300a. Message splitting could make it possible to bypass the AP-to-AP wireless link that suffers from signal deterioration without any extra relaying delay.

Figure 4:
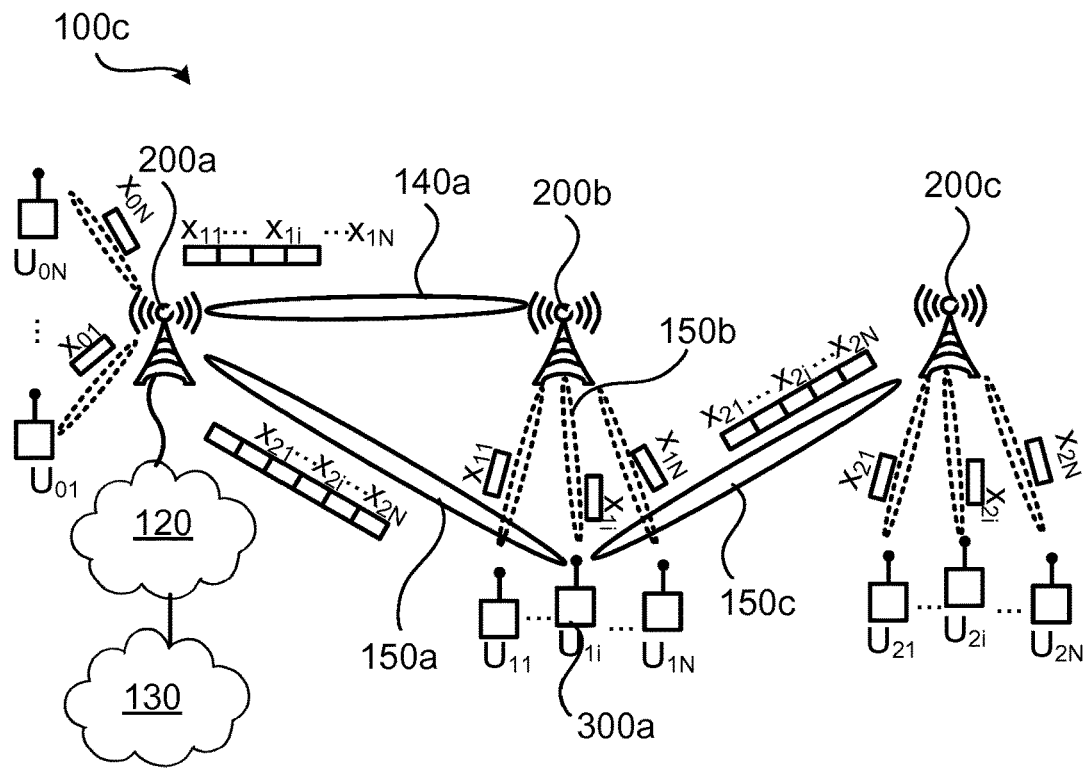

Intermediate reference is made to the communication network 100c of FIG. 4. In the illustrative example of FIG. 4, with a signal deterioration of the first AP-to-AP wireless link 140a, the complete message [$x_{11}, \ldots, x_{1N}, x_{21}, \ldots, x_{2N}$] is divided into two sub-messages. The sub-message [$x_{11}, \ldots, x_{1,i-1}, x_{1,i+1}, \ldots, x_{1N}$] is still communicated over the first AP-to-AP wireless link 140a (but with a wider beam and/or higher transmission power) whilst the sub-message [$x_{1i}, x_{2,1}, \ldots, x_{2N}$] is relayed through the first CPE 300a (also denoted $U_{1i}$). This is different from the existing relaying methods where the message of CPE $U_{1j}$, $j \neq i$, would be relayed through the wireless links from the AP 200a to CPE $U_{1i}$, then from CPE $U_{1i}$ to the second AP 200b, and then from the second AP 200b to CPE $U_{1j}$, $j \neq i$, in order to bypass the signal deterioration, but at the cost of adding one more hop to the network, which leads to more hand shakings and delays. Adding one extra hop will affect the end-to-end data transmission delay of all successive hops. According to at least some of the herein disclosed embodiments, all hops following the bypass of the wireless link suffering from signal deterioration are isolated from the wireless link suffering from signal deterioration and they are affected by neither error propagation nor extra relaying delay.

In the illustrative example of FIG. 4 there is experienced signal deterioration of the AP-to-AP wireless link between the second AP 200b and the third AP 200c (i.e., on the wireless link above denoted second AP-to-AP wireless link 140b). Particularly, according to an embodiment the first AP 200a is configured to perform (optional) step S108:

S108: The first AP 200a identifies signal deterioration of the second AP-to-AP wireless link 140b.

Data to be backhauled for the CPEs served by the third AP 200c is then also relayed via the first CPE 300a. Hence, according to this embodiment the first AP 200a is configured to perform (optional) step S110:

S110: The first AP 200a relays the data for the CPEs served by the third AP 200c via the first CPE 300a on the direct wireless link between the first AP 200a and the first CPE 300a in response thereto (i.e., in response to having identified the signal deterioration in step S110).

In some aspects, the data transmission continues for M times slots, where M is an integer, on the first direct wireless link 150a between the first AP 200a and the first CPE 300a. After M time slots, the first AP 200a might then check whether the signal deterioration has expired. Particularly, according to an embodiment the first AP 200a is configured to perform (optional) step S112:

S112: The first AP 200a periodically, or after a predetermined number of time slots, checks if the signal deterioration has expired.

If the checks reveals that the signal deterioration has not expired, the first CPE 300a is used as relay for another M times slots. If the checks reveals that the signal deterioration has expired, the first AP 200a terminates the communication on the first direct wireless link 150a between the first AP 200a and the first CPE 300a and resumes transmission on the first AP-to-AP wireless link 140a (using the first beam width). That is, in some embodiments the data for the CPEs served by the second AP 200b is relayed on the first AP-to-AP wireless link 140a upon expiration of the signal deterioration of the first AP-to-AP wireless link 140a.

There could be different ways for the first AP 200a to determine which CPE in step S104 to select for relaying the data. In some aspects which first CPE 300a to use to relay the data via is pre-configured. Particularly, according to an embodiment which first CPE 300a to relay the data via is determined during network 100a, 100b, 100c planning of the IAB network 100a, 100b, 100c.

In more detail, since the APs and CPEs might be considered as geographically stationary, the thus stationary radio propagation channel characteristics enables network planning as well as timing advance adaptation to performed offline and such that an immediate switch can be made to alternative settings when signal deterioration occurs. During the network planning different network configurations and beam directions can be tested in order to determine which CPE (and its corresponding beamforming rules) to use as relay node for signal deterioration on each of the AP-to-AP wireless links. Different metrics can be considered when determining which CPE (and its corresponding beamforming rules) to use. As an example, the CPE $U_{1i}$ with $$i = \operatorname*{argmax}_{j=1,\ldots,N} \{\min(\bar{\gamma}_{1j}, \bar{\gamma}_{j2})\}$$

can be selected, where $\bar{\gamma}_{1j}$ (and $\bar{\gamma}_{j2}$) is the average signal-to-(interference-and)-noise ratio (S(I)NR) observed in the direct wireless link between the first AP 200a and the first CPE 300a as valid for a narrow beam (and in the direct wireless link between the third AP 200c and the first CPE 300a). Thus, in some aspects, during the network planning, which CPE to select as relay is determined based on S(I)NR for all CPEs served by the second AP 200*b*, where the S(I)NR is measured for the direct wireless link between the first AP 200*a* and the first CPE 300*a* as valid for a narrow beam (and for the direct wireless link between the third AP 200*c* and the first CPE 300*a*). Particularly, according to an embodiment, which first CPE 300*a* to relay the data via is determined based on having best signal quality on a direct wireless link to the first AP 200*a* among all the CPEs served by the second AP 200*b*, and/or having best signal quality on a direct wireless link to the third AP 200*c* among all the CPEs served by the second AP 200*b*. Further, in some aspects, during the network planning, which CPE to select as relay is determined based on distance to the first AP 200*a* and/or third AP 200*b*. for all CPEs served by the second AP 200*b*. Particularly, according to an embodiment, which first CPE 300*a* to relay the data via is determined based on having shortest geographical distance to the first AP 200*a* among all the CPEs served by the second AP 200*b*, and/or shortest geographical distance to the third AP 200*c* among all the CPEs served by the second AP 200*b*. That is, the first AP 200*a* might select the CPE 300*a* with the best LOS condition, such as highest S(I)NR, and/or least distances to the first AP 200*a* and the third AP 200*c* such that outage probability of the third AP 200*c* is minimized.

Figure 5:
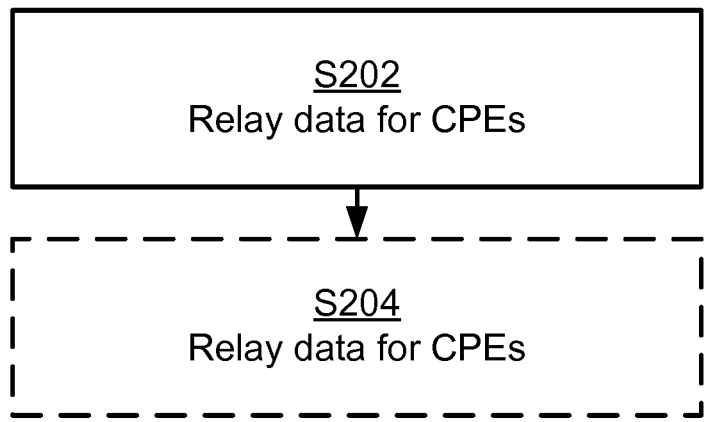

Reference is now made to FIG. 5 illustrating a method for handling a deteriorating AP-to-AP wireless link in an IAB network 100*a*, 100*b*, 100*c* as performed by the CPE 300*a* according to an embodiment. The CPE 300*a* is operable in the IAB network 100*a*, 100*b*, 100*c*. The CPE 300*a* is configured to be served by a second AP 200*b* in the IAB network 100*a*, 100*b*, 100*c*.

As disclosed above, the CPE 300 acts as a relay upon signal deterioration of a first AP-to-AP wireless link 140*a*. Particularly, the CPE 300*a* is configured to perform step S202:

S202: The CPE 300*a* relays data for CPEs served by a third AP 200*c* in the IAB network 100*a*, 100*b*, 100*c*. The data is relayed between a first AP 200*a* in the IAB network 100*a*, 100*b*, 100*c* and the third AP 200*c*. The data is relayed on a first direct wireless link 150*a* between the CPE 300*a* and the first AP 200*a*. The data is further relayed on a wireless link between the CPE 300*a* and the third AP 200*c*. The data is relayed upon signal deterioration of the first AP-to-AP wireless link 140*a*. The first AP-to-AP link 140*a* is between the first AP 200*a* and the second AP 200*b*.

By the CPE 300*a* acting as a relay node, an alternative path to the next hops can be obtained without the need for extra hardware, frequency adaptation, etc. in the IAB network 100*a*, 100*b*, 100*c*.

Embodiments relating to further details of handling a deteriorating AP-to-AP wireless link in an IAB network 100*a*, 100*b*, 100*c* as performed by the CPE 300*a* will now be disclosed.

There could be different examples of the wireless link between the CPE 300*a* and the third AP 200*c*.

In some aspects this wireless link is a direct wireless link. According to a first embodiment the wireless link between the CPE 300*a* and the third AP 200*c* is a third direct wireless link 150*c* between the CPE 300*a* and the third AP 200*c*. In other aspects this wireless link is an indirect wireless link. In other words, in some aspects the wireless link between the CPE 300*a* and the third AP 200*c* is via at least one other node in the IAB network 100*a*, 100*b*, 100*c*. There could be different examples of such indirect wireless links. According to a second embodiment the wireless link between the CPE 300*a* and the third AP 200*c* is a first indirect wireless link between the CPE 300*a* and the third AP 200*c* via another CPE 300*b* served by the second AP 200*b*. According to a third embodiment the wireless link between the CPE 300*a* and the third AP 200*c* is a second indirect wireless link between the CPE 300*a* and the third AP 200*c* via the second AP 200*b*.

Data for the CPE 300*a* might be communicated on the first direct wireless link 150*a* upon the signal deterioration of the first AP-to-AP wireless link 140*a*.

As disclosed above, in the illustrative example of FIG. 4 there is experienced signal deterioration of the AP-to-AP wireless link between the second AP 200*b* and the third AP 200*c* and the first AP 200*a* might then relay the data for the CPEs served by the third AP 200*c* via the first CPE 300*a* on the direct wireless link between the first AP 200*a* and the first CPE 300*a*. Hence, according to an embodiment the first CPE 300*a* is configured to perform (optional) step S204:

S204: The CPE 300*a* relays data for CPEs served by the third AP 200*c* between the first AP 200*a* and the third AP 200*c* on the first direct wireless link 150*a* and on the third direct wireless link 150*c* upon signal deterioration of a second AP-to-AP wireless link 140*b* between the second AP 200*b* and the third AP 200*c*.

Data for the CPE 300*a* might be communicated on the second direct wireless link 150*b* between the CPE and the second AP 200*b* upon the signal deterioration of the second AP-to-AP wireless link 140*b*.

Thus, although the CPE 300*a* relays data for CPEs served by the third AP 200*c* on the first direct wireless link 150*a*, the CPE 300*a* might communicate its own data via the second AP 200*b* as usual, i.e. via its serving AP. One motivation is that without signal deterioration on the first AP-to-AP wireless link 140*a*, with high probability, the first AP-to-AP wireless link 140*a* and the second direct wireless link 150*b* experience better channel conditions compared to the first direct wireless link 150*a*.

In some aspects the CPE 300*a* is be equipped with advanced AP-like signal processing and antenna techniques. In some aspects the same frequency spectrum is used for both network access and backhaul data transmission.

Thus, as opposed to conventional systems, the CPEs might support the APs for backhaul data transmission without the need for extra hardware, frequency adaptation, etc.

It is understood by the skilled person that the APs and CPEs involved in the network reconfiguration caused by signal deterioration of a particular wireless link might need to synchronize their signals and determine their timing advance according to the network reconfiguration. One reason for this might that the lengths of the wireless links used between the APs and CPEs might change with the network reconfiguration, thus possibly leading to different range delays. Again, timing advance values and other information needed for synchronization, etc. might be determined during the network planning and hence timing advance values do not necessarily need to be determined on the fly.

The herein disclosed embodiments are applicable for both frequency division duplex (FDD) and time division duplex (TDD) schemes as well as for both uplink and downlink transmission. Also, whilst some illustrative examples have been given for a setup with two hops in a multi-hop scenario, the setup can be easily extended to cases with arbitrary number of hops, or star-like network configuration.

Figure 6:
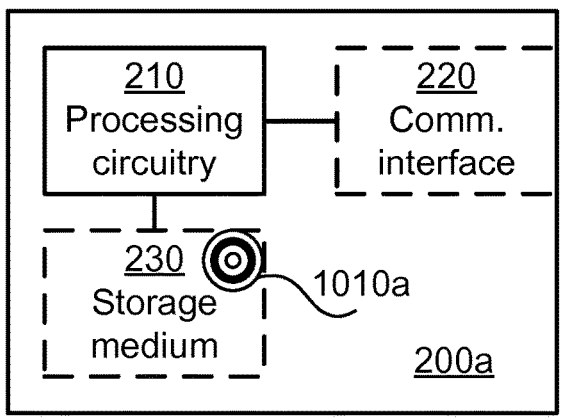
FIG. 6 is a schematic diagram showing functional units of an AP according to an embodiment.

FIG. 6 schematically illustrates, in terms of a number of functional units, the components of an AP 200*a* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010a (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the AP 200a to perform a set of operations, or steps, as disclosed above. For example, the storage medium 230 may store the set of operations, and the processing circuitry 210 may be configured to retrieve the set of operations from the storage medium 230 to cause the AP 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The AP 200a may further comprise a communications interface 220 for communications with other entities, nodes, functions, and devices, such as other APs and the CPEs. As such the communications interface 220 may comprise one or more transmitters and receivers, comprising analogue and digital components.

The processing circuitry 210 controls the general operation of the AP 200a e.g. by sending data and control signals to the communications interface 220 and the storage medium 230, by receiving data and reports from the communications interface 220, and by retrieving data and instructions from the storage medium 230. Other components, as well as the related functionality, of the AP 200a are omitted in order not to obscure the concepts presented herein.

Figure 7:
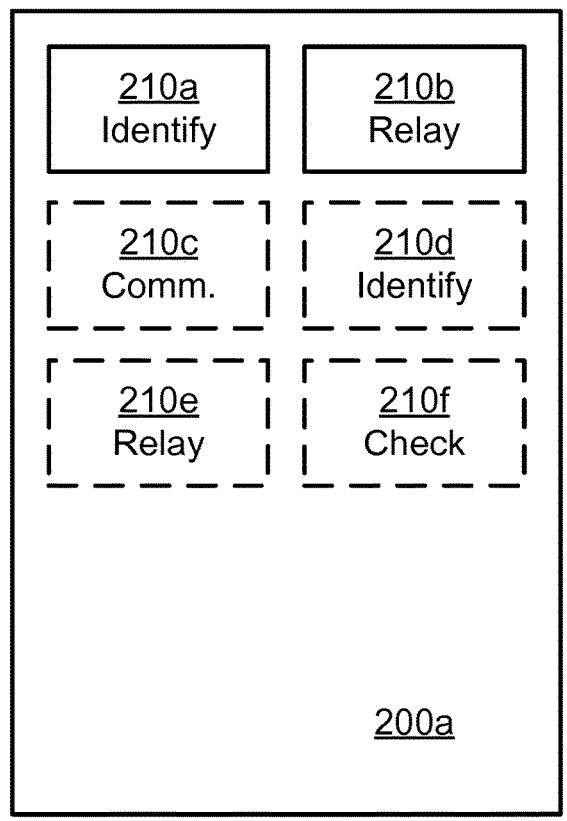
FIG. 7 is a schematic diagram showing functional modules of an AP according to an embodiment.

FIG. 7 schematically illustrates, in terms of a number of functional modules, the components of an AP 200a according to an embodiment. The AP 200a of FIG. 7 comprises a number of functional modules; an identify module 210a configured to perform step S102, and a relay module 210b configured to perform step S104. The AP 200a of FIG. 7 may further comprise a number of optional functional modules, such as any of a communication module 210c configured to perform step S106, an identify module 210d configured to perform step S108, a relay module 210e configured to perform step S110, and a check module 210f configured to perform step S112. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210f and to execute these instructions, thereby performing any steps of the AP 200a as disclosed herein.

Figure 8:
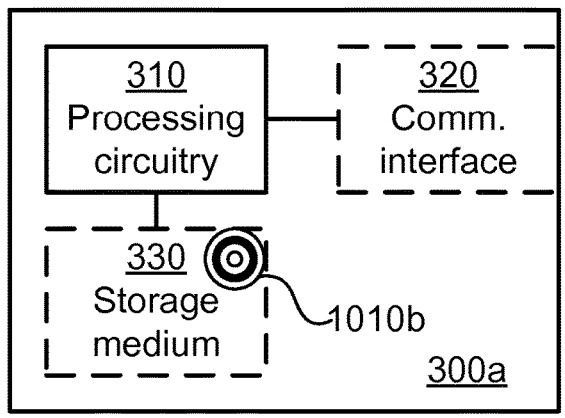
FIG. 8 is a schematic diagram showing functional units of a CPE according to an embodiment.

FIG. 8 schematically illustrates, in terms of a number of functional units, the components of a CPE 300a according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1010b (as in FIG. 10), e.g. in the form of a storage medium 330. The processing circuitry 310 may further be provided as at least one application specific integrated circuit (ASIC), or field programmable gate array (FPGA).

Particularly, the processing circuitry 310 is configured to cause the CPE 300a to perform a set of operations, or steps, as disclosed above. For example, the storage medium 330 may store the set of operations, and the processing circuitry 310 may be configured to retrieve the set of operations from the storage medium 330 to cause the CPE 300a to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The CPE 300a may further comprise a communications interface 320 for communications with other entities, nodes, functions, and devices, such as APs and other CPEs. As such the communications interface 320 may comprise one or more transmitters and receivers, comprising analogue and digital components.

The processing circuitry 310 controls the general operation of the CPE 300a e.g. by sending data and control signals to the communications interface 320 and the storage medium 330, by receiving data and reports from the communications interface 320, and by retrieving data and instructions from the storage medium 330. Other components, as well as the related functionality, of the CPE 300a are omitted in order not to obscure the concepts presented herein.

Figure 9:
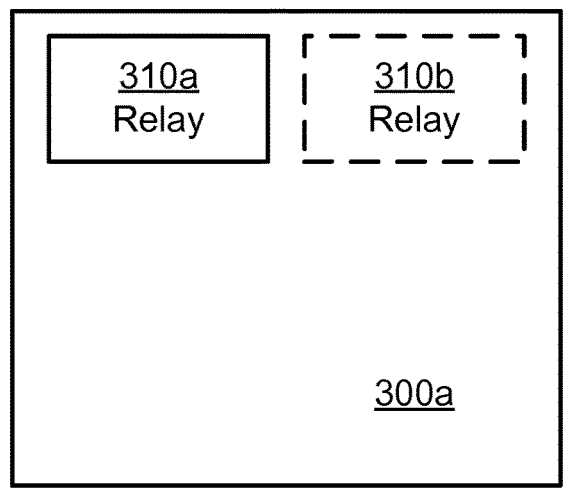
FIG. 9 is a schematic diagram showing functional modules of a CPE according to an embodiment.

FIG. 9 schematically illustrates, in terms of a number of functional modules, the components of a CPE 300a according to an embodiment. The CPE 300a of FIG. 9 comprises a relay module 310a configured to perform step S202. The CPE 300a of FIG. 9 may further comprise a number of optional functional modules, such as a relay module 310b configured to perform step S204. In general terms, each functional module 310a-310b may be implemented in hardware or in software. Preferably, one or more or all functional modules 310a-310b may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310b and to execute these instructions, thereby performing any steps of the CPE 300a as disclosed herein.

Each AP 200a, 200b, 200c and CPE 300a may be provided as a standalone device or as a part of at least one further device. For example, each of the AP 200a, 200b, 200c and CPE 300a may be provided in a node of the radio access network or in a node of the core network. Alternatively, functionality of each AP 200a, 200b, 200c and CPE 300a may be distributed between at least two devices, or nodes. Thus, a first portion of the instructions performed by the AP 200a and/or CPE 300a may be executed in a first device, and a second portion of the of the instructions performed by the AP 200a and/or CPE 300a may be executed in a second device; the herein disclosed embodiments are not limited to any particular number of devices on which the instructions performed by the AP 200a and/or CPE 300a may be executed. Hence, the methods according to the herein disclosed embodiments are suitable to be performed by an AP 200a and/or CPE 300a whose functionality at least partly resides in a cloud computational environment. Therefore, although a single processing circuitry 210, 310 is illustrated in FIGS. 6 and 8 the processing circuitry 210, 310 may be distributed among a plurality of devices, or nodes. The same applies to the functional modules 210a-210f, 310a-310b of FIGS. 7 and 9 and the computer programs 1020a, 1020b of FIG. 10.

Figure 10:
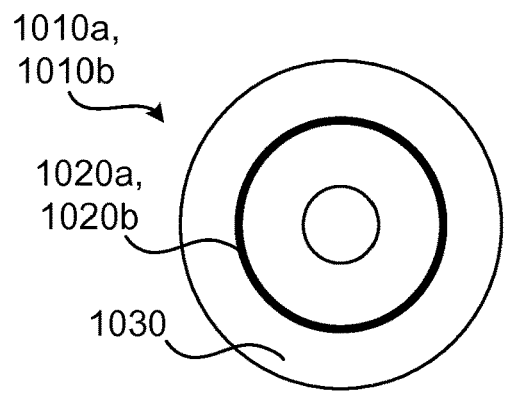
FIG. 10 shows one example of a computer program product comprising computer readable means according to an 1010 embodiment.

FIG. 10 shows one example of a computer program product 1010a, 1010b comprising computer readable means 1030. On this computer readable means 1030, a computer program 1020a can be stored, which computer program 1020a can cause the processing circuitry 210 and thereto operatively coupled entities and devices, such as the communications interface 220 and the storage medium 230, to execute methods according to embodiments described herein. The computer program 1020a and/or computer program product 1010a may thus provide means for performing any steps of the AP 200a as herein disclosed. On this computer readable means 1030, a computer program 1020b can be stored, which computer program 1020b can cause the processing circuitry 310 and thereto operatively coupled entities and devices, such as the communications interface 320 and the storage medium 330, to execute methods according to embodiments described herein. The computer program 1020b and/or computer program product 1010b may thus provide means for performing any steps of the CPE 300a as herein disclosed.

In the example of FIG. 10, the computer program product 1010a, 1010b is illustrated as an optical disc, such as a CD (compact disc) or a DVD (digital versatile disc) or a Blu-Ray disc. The computer program product 1010a, 1010b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020a, 1020b is here schematically shown as a track on the depicted optical disk, the computer program 1020a, 1020b can be stored in any way which is suitable for the computer program product 1010a, 1010b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for handling a deteriorating access point to access point (AP-to-AP) wireless link in an integrated access and backhaul (IAB) network, the method being performed by a first access point (AP) in the IAB network, the method comprising:
identifying signal deterioration of a first AP-to-AP wireless link between the first AP and a second AP in the IAB network, the first AP-to-AP wireless link being used for backhauling data for customer premises equipments (CPEs) served by the second AP and for backhauling data for CPEs served by a third AP in the IAB network, wherein the CPEs served by the second AP include a first CPE, and the second AP has a second AP-to-AP wireless link to the third AP for backhauling data for the CPEs served by the third AP;
receiving a message for a second CPE; and
in response to identifying the signal deterioration, transmitting to the first CPE the message for the second CPE, wherein the message for the second CPE is transmitted to the first CPE on a first direct wireless link between the first AP and the first CPE, and
the first CPE is configured to relay the message for the second CPE towards the second CPE.

2. The method of claim 1, wherein the second CPE is served by the third AP.

3. The method of claim 1, wherein a transmission and reception beam of a first beam width is used for the first AP-to-AP wireless link, the method further comprising, upon having identified the signal deterioration:
communicating, on the first AP-to-AP wireless link and using a transmission and reception beam of a second beam width being wider than the first beam width, the data for all CPEs served by the second AP, except the data for said first CPE.

4. The method of claim 3, wherein the transmission and reception beam of the second beam width has higher power than the transmission and reception beam of the first beam width.

5. The method of claim 1, further comprising:
receiving a second message for a third CPE, wherein the third CPE is served by the third AP;
identifying signal deterioration of the second AP-to-AP wireless link; and
in response to identifying the signal deterioration of the second AP-to-AP wireless link, transmitting to the first CPE the second message for the third CPE, wherein
the message for the third CPE is transmitted to the first CPE on the first direct wireless link between the first AP and the first CPE, and
the first CPE is configured to relay the second message for the third CPE towards the second CPE.

6. The method of claim 5, further comprising:
receiving a third message for a fourth CPE, wherein the fourth CPE is served by the second AP;
determining the signal deterioration of the first AP-to-AP wireless link has expired; and
transmitting the third message to the second AP on the first AP-to-AP wireless link.

7. The method of claim 1, further comprising:
prior to identifying the signal deterioration of the first AP-to-AP wireless link, selecting the first CPE as a relay CPE.

8. The method of claim 7, wherein selecting the first CPE as the relay CPE comprises:
determining the first CPE has a signal quality on a direct wireless link to the first AP better than other CPEs served by the second AP; and/or
determining the first CPE has a signal quality on a direct wireless link to the third AP better than other CPEs served by the second AP.

9. The method of claim 7, wherein selecting the first CPE as the relay CPE comprises:
determining the first CPE has a geographical distance to the first AP less than other CPEs served by the second AP; or
determining the first CPE has a geographical distance to the third AP less than other CPEs served by the second AP.

10. A method for handling a deteriorating access point to access point (AP-to-AP) wireless link in an integrated access and backhaul (IAB) network comprising a first access point (AP), a second AP, and a third AP, the method being performed by a first customer premises equipment (CPE) in the IAB network, the first CPE being served by the second AP in the IAB network, the method comprising:

the first CPE receiving a message for a second CPE served by the third AP, wherein the message for the second CPE was transmitted by the first AP after the first AP detected signal deterioration of a first AP-to-AP wireless link between the first AP and the second AP, and the message for the second CPE was transmitted on a first direct wireless link between the first CPE and the first AP; and the first CPE transmitting the message for the second CPE directly to the second AP, directly to the third AP, or directly to a third CPE.

11. The method of claim 10, wherein the first CPE transmits the message for the second CPE directly to the third AP, and the first CPE transmits the message for the second CPE on a second direct wireless link between the first CPE and the third AP.

12. The method of claim 11, wherein:
the first CPE transmits the message for the second CPE directly to the third AP upon signal deterioration of a second AP-to-AP wireless link between the second AP and the third AP.

13. The method of claim 12, wherein the first CPE transmits the message for the second CPE directly to the third AP on a second direct wireless link.

14. The method of claim 10, wherein
the first CPE transmits the message for the second CPE directly to the third CPE,
the third CPE is configured to relay the message for the second CPE towards the second CPE, and
the third CPE served by the second AP.

15. The method of claim 10,
the first CPE transmits the message for the second CPE directly to the second AP, and
the second AP is configured to relay the message for the second CPE towards the second CPE.

16. A first access point (AP) for handling a deteriorating AP-to-AP wireless link in an integrated access and backhaul (IAB) network, the first AP being operable in the IAB network and comprising processing circuitry, the processing circuitry being configured to cause the first AP to:

identify signal deterioration of a first AP-to-AP wireless link between the first AP and a second AP in the IAB network, the first AP-to-AP wireless link being used for backhauling data for customer premises equipments (CPEs) served by the second AP and for backhauling data for CPEs served by a third AP in the IAB network, wherein the CPEs served by the second AP include a first CPE, and the second AP has a second AP-to-AP wireless link to the third AP for backhauling data for the CPEs served by the third AP;

receive a message for a second CPE; and in response to identifying the signal deterioration, transmit to the first CPE the message for the second CPE, wherein the message for the second CPE is transmitted to the first CPE on a first direct wireless link between the first AP and the first CPE, and the first CPE is configured to relay the message for the second CPE towards the second CPE.

17. A first customer premises equipment (CPE) for handling a deteriorating access point (AP) to AP (AP-to-AP) wireless link in an integrated access and backhaul (IAB) network comprising a first AP, a second AP, and a third AP, the first CPE being served by the second AP in the IAB network, the first CPE comprising:

memory; and processing circuitry coupled to the memory, wherein the CPE is configured to:

receive a message for a second CPE served by the third AP, wherein the message for the second CPE was transmitted by the first AP after the first AP detected signal deterioration of a first AP-to-AP wireless link between the first AP and the second AP, and the message for the second CPE was transmitted on a first direct wireless link between the first CPE and the first AP; and transmit the message for the second CPE directly to the second AP, directly to the third AP, or directly to a third CPE.

* * * * *